Figure 1:
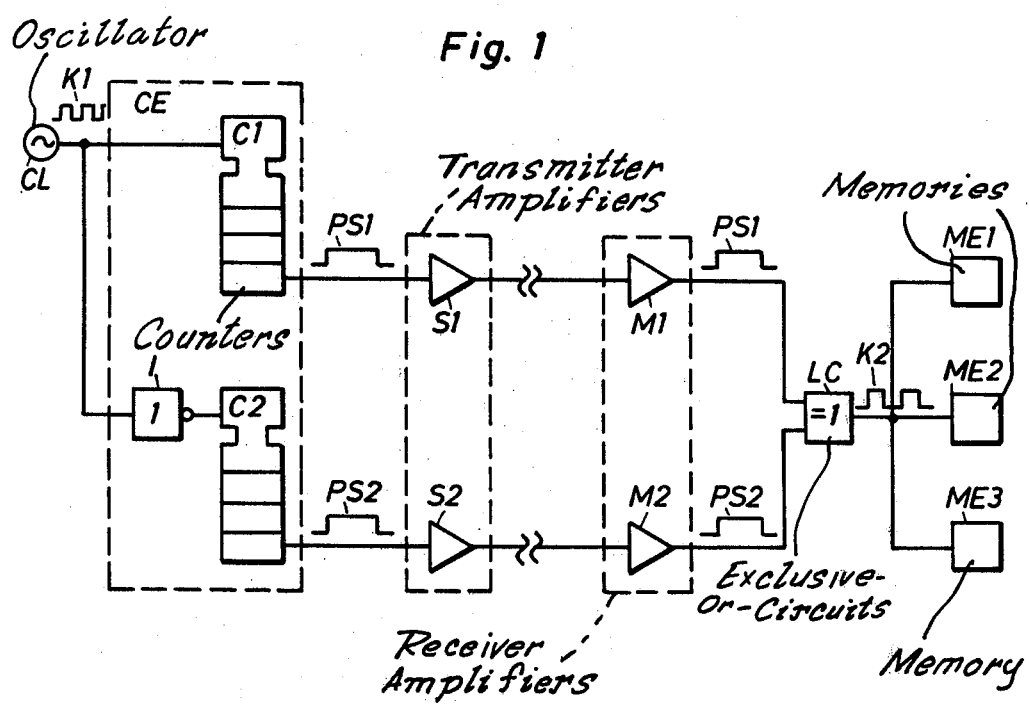

United States Patent [19]

Roos

[11] 4,147,891

[45] Apr. 3, 1979

[54] ARRANGEMENT FOR DISTRIBUTION OF CLOCK SIGNALS

[75] Inventor: Sture G. Roos, Bergshamra, Sweden

[73] Assignee: Telefonaktiebolaget L M Ericsson, Stockholm, Sweden

[21] Appl. No.: 835,137

[22] Filed: Sep. 21, 1977

[30] Foreign Application Priority Data

Oct. 8, 1976 [SE] Sweden .............................. 7611223

[51] Int. Cl.² ........................................... H04L 7/00
[52] U.S. Cl. ..................................... 178/69.1; 325/42
[58] Field of Search .................. 178/69.1; 325/40, 59, 325/42; 328/216, 225; 364/703; 340/167 R, 167 A, 167 B

[56] References Cited

U.S. PATENT DOCUMENTS

| | | | |
|---|---|---|---|
| 2,957,947 | 10/1960 | Bowers | 325/42 |
| 2,973,509 | 2/1961 | Majerus | 340/167 B |
| 3,118,131 | 1/1964 | Wright | 340/167 R |
| 3,483,510 | 12/1969 | Widl | 340/146.1 D |
| 3,953,832 | 4/1976 | Streckenbach | 325/42 |
| 3,980,960 | 9/1976 | Huthinson | 340/167 A |

Primary Examiner—Robert L. Griffin
Assistant Examiner—Michael A. Masinick
Attorney, Agent, or Firm—Hane, Roberts, Spiecens & Cohen

[57] ABSTRACT

The invention concerns an arrangement for transmission of certain clock signals in a series of clock signals by means of signals of lower frequency compared to the frequency of said series of clock signals. From said signals of lower frequency well-defined pulses are extracted for controlling logic equipment located distantly from the clock pulse source. The arrangement includes at the sender side a clock pulse generator producing said series of clock signals, a counter which is stepped by said series of clock pulses and produces at least two pulse series phase displaced with respect to each other where the length of the pulses of said pulse series is a multiple of the length of the pulses of the first mentioned clock pulse series. The phase displacement between said at least two pulse series corresponds to half the length of the pulses of said clock pulse series. The frequency of said at least two pulse series is lower than the frequency of said clock pulse series. The arrangement also includes two transmitters for transmission of said two pulse series. At the receiver side the arrangement includes two receivers for receiving the two pulse series transmitted through the line, a logical circuit detecting the two phase displaced pulse series and depending on a defined ratio between the amplitudes of the two signals, delivering a pulse during the duration of said defined ratio.

1 Claim, 2 Drawing Figures

ARRANGEMENT FOR DISTRIBUTION OF CLOCK SIGNALS

The present invention refers to an arrangement for distribution of certain clock signals in a clock signal series by means of signals of lower frequency compared to the frequency of said clock signal series, particularly in order to obtain well-defined pulses from said signals of lower frequency, for control of logic equipment placed at a distance from the clock pulse source.

When distributing clock signals to different equipment which are placed at some distance from the clock pulse source, distortion can occur in the transmission lines. This results in that the clock pulses obtain indefinite flanks and can influence the equipment at different times.

The purpose of the invention is to achieve a clock distribution arrangement by means of which short, well-defined pulses can be produced in the receiver equipment so that the uncertainty due to the distortion is eliminated.

The invention which solves said problem is characterized in accordance with the claim.

Figure 2:
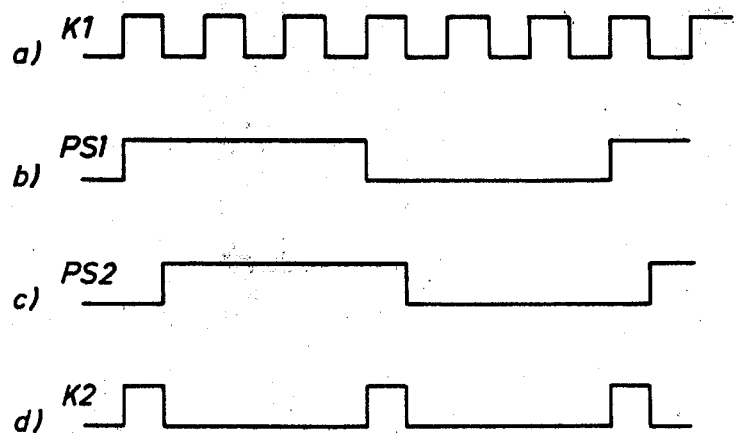

The invention is described by means of an embodiment with reference to the appended drawings in which FIG. 1 shows a block diagram of the invention and FIG. 2 shows a diagram of signals generated in the arrangement according to the invention.

In FIG. 1 a clock pulse oscillator CL delivers a clock pulse train K1 to a counter arrangement CE containing two binary counters C1 and C2 and an inversion circuit I. In order to divide the frequency the clock pulse train K1 is connected directly to the input of the binary counter C1 and through the inversion circuit I to the input of the binary counter C2. Thus both counters C1 and C2 are fed from the clock signal K1 but with inverted phase positions. From a determined output on each of the counters C1 and C2 a pulse series PS1 and PS2 is obtained respectively the pulse width of which, compared with the clock pulse, is dependent on the chosen counter step, the phase positions of the two pulse series differing from each other with half a clock pulse length. The two pulse series PS1 and PS2 are each fed to an amplifier S1 and S2 respectively and are transferred from these to associated receivers M1 and M2 on the receiver side. The transmitters S1 and S2 are mounted in the same case, and so are the receivers M1 and M2 which results in that the pulse series will have the same distortion at the receiver side. The pulse series PS1 and PS2 are fed from the receivers M1 and M2 to the inputs of an EXCLUSIVE-OR-circuit LC on the output of which pulses K2 are obtained during the time when the amplitudes of said pulse series differ from each other. The pulses K2 which are obtained at the output of the EXCLUSIVE-OR-circuit are then distributed to a number of units in order to control the same. According to the preferred embodiment said units are composed of memories ME1-ME3.

FIG. 2 shows the time sequence for the different pulse series.

Line a shows the original clock pulse series K1.

Line b shows the pulse series PS1 obtained by dividing by for example six.

Line c shows the other pulse series PS2 obtained by dividing by for example six, but which is phase displaced with half a clock pulse length compared to the first pulse series.

Line d, finally, shows the pulse series K2 which is obtained when the two transmitted pulse series PS1 and PS2 have been subject to an EXCLUSIVE-OR operation in the circuit LC.

The logic circuit LC to which the pulse series PS1 and PS2 are fed must, of course, not be an EXCLUSIVE-OR-circuit but can consist of, for example, an AND-circuit or a circuit which combines different logic functions which makes it possible to produce different pulse series in dependence on amplitudes that are detected in the transmitted pulse series.

It is also possible, instead of producing two pulse series on the sender side, to produce three or more pulse series which are transmitted in order to constitute a number of desired pulse series with well-defined pulses on the receiver side.

I claim:

1. An arrangement for transmission and reception of a plurality of clock signals in order to obtain well-defined pulses derived from said clock signals for control of logical circuits placed remote from a clock pulse source comprising on the sender side,
   a clock pulse generating means for generating clock pulses,
   counting means connected to said clock pulse generating means, said counting means receiving said clock pulses and producing at least two pulse signals, said pulse signals being phase displaced with respect to each other, the width of the pulses of said pulse signals being a multiple of the width of the pulses of said clock pulses, and the phase displacement between said at least two pulse signals corresponds to half the length of one cycle of the pulses of said clock pulses, the frequency of said at least two pulse signals being lower than the frequency of said clock pulses,
   transmitting means for each of said at least two pulse signals for transmitting each pulse signal on a line, and on the receiver side;
   receiving means corresponding to each of said at least two pulse signals for receiving the pulse signals transmitted through the line,
   logical means, connected to the receiving means, for detecting the transmitted pulse signals which are phase displaced with respect to each other, and in dependence on a defined ratio between the amplitudes of the at least two pulse signals, producing said well-defined pulses when said defined ratio exists.

* * * * *